United States Patent
Oketani et al.

(10) Patent No.: US 10,348,144 B2
(45) Date of Patent: Jul. 9, 2019

(54) PERMANENT-MAGNET-EMBEDDED MOTOR

(71) Applicant: Mitsubishi Electric Corporation, Tokyo (JP)

(72) Inventors: Naohiro Oketani, Tokyo (JP); Kazuhiko Baba, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 447 days.

(21) Appl. No.: 15/305,720

(22) PCT Filed: Jun. 11, 2014

(86) PCT No.: PCT/JP2014/065484
§ 371 (c)(1),
(2) Date: Oct. 21, 2016

(87) PCT Pub. No.: WO2015/189938
PCT Pub. Date: Dec. 17, 2015

(65) Prior Publication Data
US 2017/0047801 A1    Feb. 16, 2017

(51) Int. Cl.
*H02K 1/27*    (2006.01)
(52) U.S. Cl.
CPC ........... *H02K 1/2766* (2013.01); *H02K 1/276* (2013.01); *H02K 2213/03* (2013.01)
(58) Field of Classification Search
CPC ........ H02K 1/27; H02K 1/276; H02K 1/2766; H02K 1/272

(Continued)

(56) References Cited

U.S. PATENT DOCUMENTS 4,393,320 A * 7/1983 Anderson ............... H02K 1/276
310/156.49
5,936,322 A   8/1999 Yamaguchi et al.
(Continued)

FOREIGN PATENT DOCUMENTS

JP    3087753 U    5/2002
JP    3500822 B2    12/2003
(Continued)

OTHER PUBLICATIONS

International Search Report of the International Searching Authority dated Aug. 12, 2014 for the corresponding International application No. PCT/JP2014/065484 (and English translation).

(Continued)

*Primary Examiner* — Jeremy A Luks
(74) *Attorney, Agent, or Firm* — Posz Law Group, PLC

(57) ABSTRACT

A rotor iron core includes: a plurality of first iron cores and arranged in an outer side in a radial direction of each permanent magnet; and a second iron core with mechanical strength higher than mechanical strength of each first iron core and that includes an inner iron core arranged on an inner side in the radial direction of each permanent magnet and a plurality of inter-magnetic pole iron cores formed integrally with the inner iron core and arranged between magnetic poles of each permanent magnet, wherein each inter-magnetic pole iron core is formed from an end part in a circumferential direction of each first iron core to the inner iron core, and a flux barrier is formed between each permanent magnet and each inter-magnetic pole iron core.

6 Claims, 4 Drawing Sheets

(58) Field of Classification Search
USPC .................. 310/156.48, 156.49, 156.53
See application file for complete search history.

(56) References Cited

U.S. PATENT DOCUMENTS

| | | | | |
|---|---|---|---|---|
| 6,034,458 | A * | 3/2000 | Uetake .................. | H02K 1/276 310/156.49 |
| 8,487,495 | B2 * | 7/2013 | Takizawa ............... | H02K 1/276 310/156.01 |
| 2014/0354105 | A1 * | 12/2014 | Sedano Perez ........ | H02K 1/276 310/156.53 |
| 2016/0352164 | A1 * | 12/2016 | Mochida ................ | H02K 19/10 |
| 2017/0104375 | A1 * | 4/2017 | Kim ..................... | H02K 1/2773 |
| 2018/0358876 | A1 * | 12/2018 | Fatemi .................. | H02K 1/02 |

FOREIGN PATENT DOCUMENTS

| | | |
|---|---|---|
| JP | 2005-057816 A | 3/2005 |
| JP | 2008-154329 A | 7/2008 |
| JP | 4291211 B2 | 4/2009 |
| JP | 4969064 B2 | 4/2012 |
| JP | 2012-115089 A | 6/2012 |
| JP | 2013-126318 A | 6/2013 |
| JP | 2013-132138 A | 7/2013 |
| JP | 2013-223407 A | 10/2013 |
| JP | 2013-229955 A | 11/2013 |
| JP | 2014-003815 A | 1/2014 |

OTHER PUBLICATIONS

Office action dated Jan. 29, 2018 issued in corresponding CN patent application No. 201480077950.2 (and English machine translation thereof).

* cited by examiner

PERMANENT-MAGNET-EMBEDDED MOTOR

CROSS REFERENCE TO RELATED APPLICATION

This application is a U.S. national stage application of International Patent Application No. PCT/JP2014/065484 filed on Jun. 11, 2014, the disclosure of which is incorporated herein by reference.

TECHNICAL FIELD

The present invention relates to a permanent-magnet-embedded motor.

BACKGROUND

A general permanent-magnet-embedded motor includes a stator iron core, and a rotor which is arranged on an inside diameter side of the stator iron core and in which a permanent magnet is embedded in an inner part of a rotor iron core. The rotor iron core is formed by stamping of an electromagnetic steel sheet into a predetermined shape and by swaging and laminating of a plurality of stamped electromagnetic steel sheets. In the rotor iron core, magnet insertion holes are formed at substantially equal intervals in a circumferential direction according to the number of magnetic poles in the permanent magnet. Each magnet insertion hole is stretched in an axial direction and a permanent magnet is inserted into an inner part of each magnet insertion hole.

Here, an outer side surface in a radial direction of the permanent magnet inserted into each magnet insertion hole and an inner side surface in the radial direction thereof are connected to each other via a thin part formed between the magnetic poles of the permanent magnet. Then, magnetic flux generated in each permanent magnet passes through a core back of the stator iron core and goes back to the rotor iron core. However, a part of the magnetic flux from a surface of each permanent magnet becomes leakage flux that passes through the thin part, stays in the inner part of the rotor iron core, and goes back to the permanent magnet instead of going to the core back. That is, a part of the magnetic flux that goes out from one surface of each permanent magnet passes through the thin part and enters a different surface of the permanent magnet without passing through the stator iron core. Such leakage flux does not contribute to torque and becomes a factor of increasing an iron loss in the rotor. Thus, the leakage flux is preferably controlled as much as possible. In such a manner, since a thin part formed between the magnetic poles becomes a path of leakage flux, a width thereof is preferably as narrow as possible.

However, since centrifugal force during a high-speed rotation of the rotor of the permanent-magnet-embedded motor acts on the permanent magnet, centrifugal force that acts on each part of the rotor iron core becomes large in proportion to the square of the number of rotations in a case where an upper limit of the number of rotations of the rotor becomes higher. Thus, in the thin part of the rotor iron core, it is necessary to increase strength of a part that supports a surface on an outer side in a radial direction of the permanent magnet. For example, it is necessary to widen a width of the thin part in proportional to the square of the number of rotations.

As a method of improving the strength of the rotor iron core other than widening of the width of the thin part between the magnetic poles, it is considered to divide each of the permanent magnet, which configures each magnetic pole, and the magnet insertion hole into two or more in a circumferential direction and to provide a bridge, which connects an outer side in a radial direction of the rotor iron core and an inner side in the radial direction thereof, between the divided magnet insertion holes.

However, similarly to the above-described thin part between the magnetic poles, this bridge becomes a path of leakage flux and a width in a circumferential direction of the magnet is decreased for a width of the bridge. Thus, when the bridge is provided and the width in the circumferential direction of the magnet is decreased, there is a problem that an effective magnetic flux that contributes to torque is decreased and a size of the permanent-magnet-embedded motor is increased in order to cover the decrease.

As a method that does not depend on providing of a bridge, it is considered to use a steel sheet with mechanical strength higher than that of an electromagnetic steel sheet including silicon steel or Armco iron (hereinafter, referred to as "high-strength steel sheet") in a rotor iron core. However, a high-strength steel sheet generally has an inferior magnetic characteristic, specifically an inferior iron loss characteristic, compared to an electromagnetic steel sheet. Thus, an iron loss in the rotor is increased greatly in a case where an electromagnetic steel sheet in the whole rotor iron core is replaced with the high-strength steel sheet. Thus, an iron core including an electromagnetic steel sheet is used in a part where the most of an iron loss in the whole rotor is generated, that is, a part on an outer side in a radial direction of a permanent magnet and an iron core including a high-strength steel sheet is used in the remaining part.

For example, in a motor described in Patent Literature 1, a rotary shaft includes an iron core part on an outer side in a radial direction of a plurality of permanent magnets (hereinafter, referred to as "A part") and an iron core part other than the A part (hereinafter, referred to as "B part"). The B part includes an iron core part on an inner side in a radial direction of each permanent magnet and an iron core part between magnetic poles. The A part includes silicon steel or Armco iron with a superior magnetic characteristic and the B part includes carbon steel with a mechanical strength higher than that of the A part. Then, the iron core part between the magnetic poles is formed in a T-shape. Hereinafter, the T-shaped iron core part will be referred to as an "engagement part." The engagement part is extended from an outer peripheral part of the B part toward an outer side in a radial direction between the magnetic poles and has a leading end branching in a T-shape. Moreover, at a leafing end of the part branching in the T-shape, a recessed part to be engaged with a protruded part in an end part in a circumferential direction of the A part is formed. With this configuration, coming off of the iron core part of the A part from the rotary shaft due to the centrifugal force in a rotation of the rotary shaft is prevented.

PATENT LITERATURE

Patent Literature 1: Japanese Patent Application Laid-Open No. 2008-154329

However, according to a conventional technology in Patent Literature 1, a method of reducing leakage flux is not disclosed in this literature although it is possible to improve centrifugal force resistant strength. That is, since a T-shaped engagement part becomes a path of leakage flux, there is a problem that it is not possible to control an increase in an iron loss and leakage flux although it is possible to improve centrifugal force resistant strength.

SUMMARY

The present invention has been achieved in view of the above and it is an object of the present invention to obtain a permanent-magnet-embedded motor that can control an increase in an iron loss and leakage flux while securing mechanical strength for resisting centrifugal force.

In order to solve the above-mentioned problems and achieve the object, according to an aspect of the present invention, there is provided a permanent-magnet-embedded motor in which a plurality of magnets is embedded in a rotor iron core, wherein the rotor iron core includes: a plurality of first iron cores arranged on an outer side in a radial direction of each magnet; and a second iron core having mechanical strength higher than mechanical strength of each of the first iron cores and that includes an inner iron core arranged on an inner side in the radial direction of each of the magnets and a plurality of inter-magnetic pole iron cores formed integrally with the inner iron core and arranged between magnetic poles of each of the magnets, each of the inter-magnetic pole iron cores contacts an end part in a circumferential direction of each of the first iron cores and is formed from the end part in the circumferential direction of each of the first iron cores to the inner iron core, and a flux barrier is formed between each of the magnets and each of the inter-magnetic pole iron cores.

According to this invention, it is possible to control an increase in an iron loss and leakage flux while securing mechanical strength for resisting centrifugal force.

DETAILED DESCRIPTION

Embodiments of a permanent-magnet-embedded motor according to the present invention will be described below in detail with reference to the drawings. Note that the present invention is not limited to the embodiments.

First Embodiment

Figure 1:
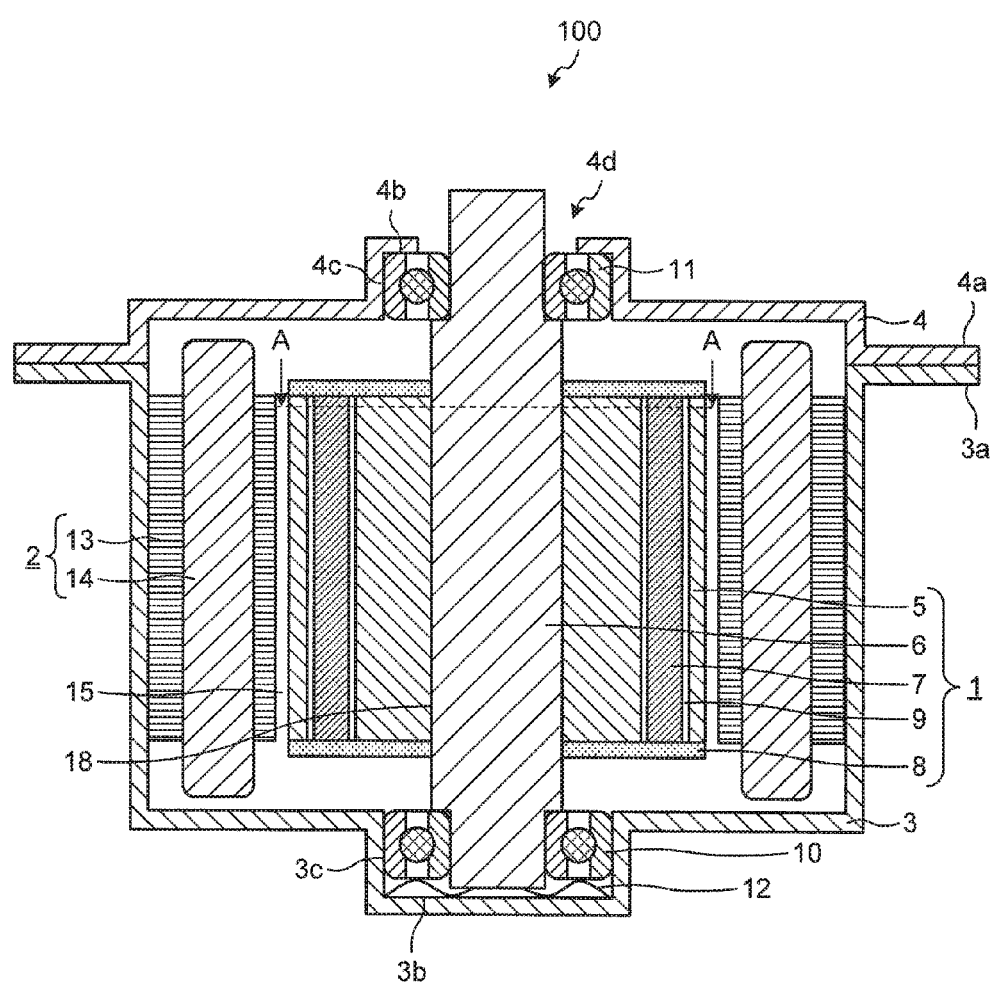
FIG. 1 is a longitudinal sectional view illustrating a schematic configuration of a permanent-magnet-embedded motor according to a first embodiment of the present invention.
Figure 2:
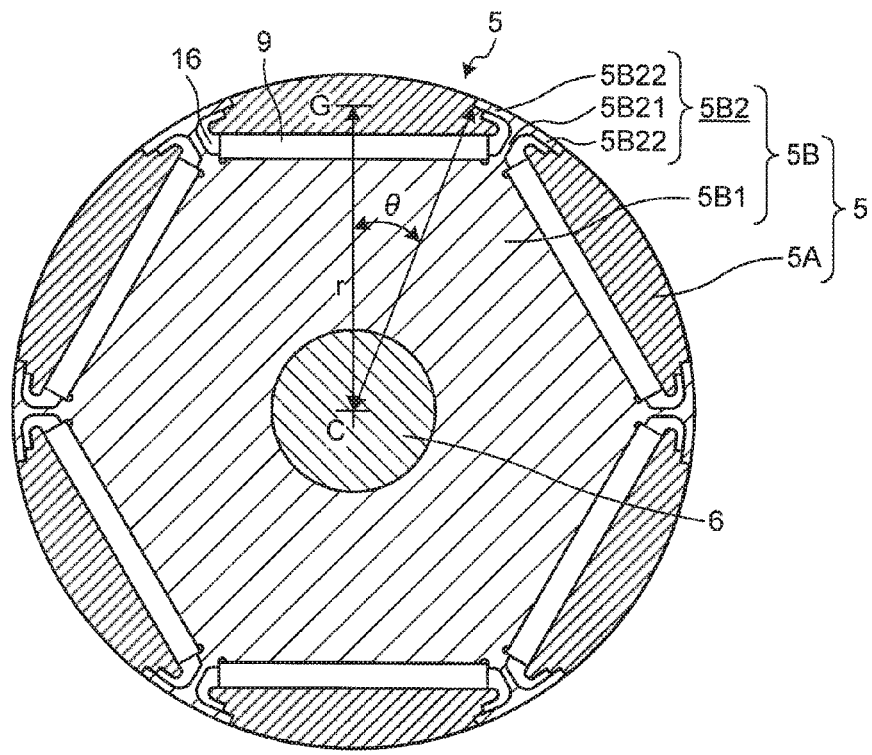
FIG. 2 is an A-A sectional view of a rotor iron core illustrated in FIG. 1.
Figure 3:
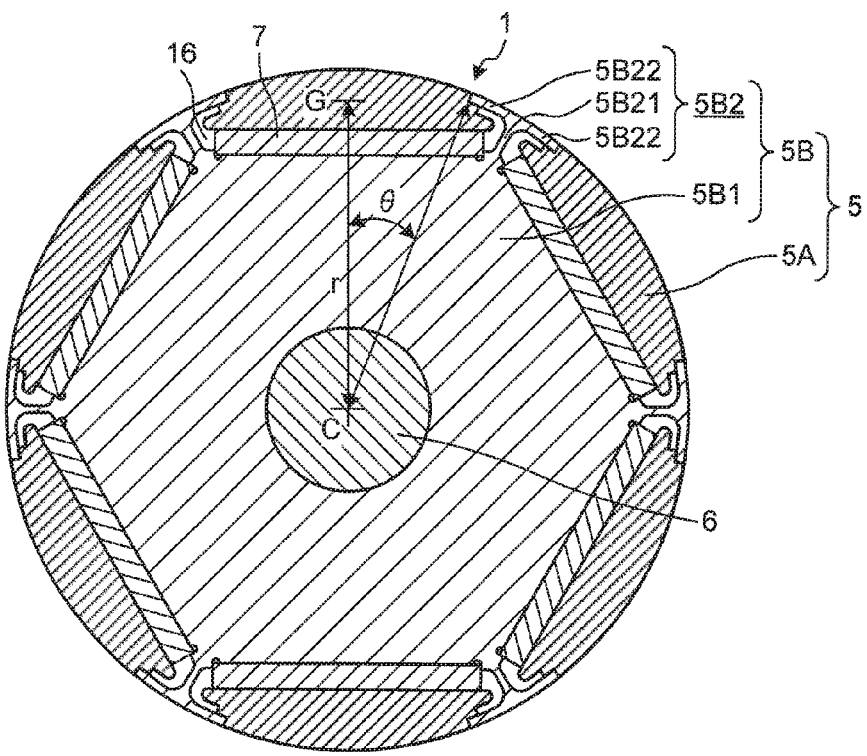
FIG. 3 is a sectional view of a rotor in which a permanent magnet is embedded in a magnet insertion hole in FIG. 2.
Figure 4:
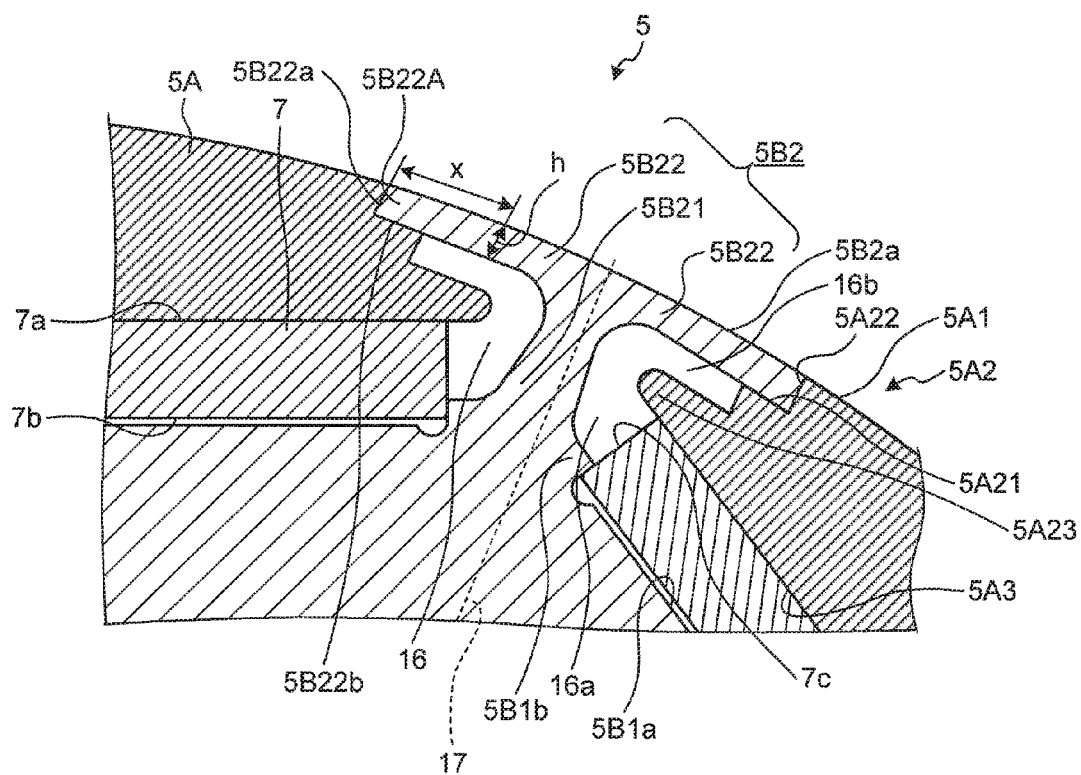
FIG. 4 is a view in which an inter-magnetic pole iron core and a periphery thereof illustrated in FIG. 3 are enlarged.

FIG. 1 is a longitudinal sectional view illustrating a schematic configuration of a permanent-magnet-embedded motor 100 according to a first embodiment of the present invention. FIG. 2 is an A-A sectional view of a rotor iron core 5 illustrated in FIG. 1. FIG. 3 is a sectional view of a rotor 1 in which a permanent magnet 7 is embedded in a magnet insertion hole 9 in FIG. 2. FIG. 4 is a view in which an inter-magnetic pole iron core 5B2 and a periphery thereof illustrated in FIG. 3 are enlarged.

The permanent-magnet-embedded motor 100 includes the rotor 1, a stator 2, a frame 3, and a bracket 4.

The frame 3 is formed in a cylindrical shape with a bottom and one end in an axial direction of the frame 3 is formed in a flange shape toward an outer side in a radial direction. A flange part 3a formed in the flange shape is arranged in such a manner as to be in contact with a flange part 4a formed in the bracket 4.

At a center part in the other end in the axial direction (bottom part) of the frame 3, a protruded recessed part 3c is formed toward an anti-load side of the rotor 1 (lower side in FIG. 1). In the recessed part 3c, a bearing 10 to support a shaft 6 on the anti-load side of the rotor 1 is arranged.

Note that a wave washer 12 is arranged between a bottom surface of the recessed part 3c (seating surface part 3b) and the bearing 10. Since the wave washer 12 biases an outer ring of the bearing 10 in the axial direction, it is possible to apply precompression to the bearing 10 and to control a vibration of the shaft 6.

The bracket 4 is formed in a cylindrical shape and one end in the axial direction of the bracket 4 is formed in a flange shape toward an outer side in a radial direction. The flange part 4a formed in the flange shape is arranged in such a manner as to be in contact with the flange part 3a formed in the frame 3.

At the center part in the other end in the axial direction of the bracket 4, a protruded recessed part 4c is formed toward a load side of the rotor 1 (upper side in FIG. 1). In the recessed part 4c, a bearing 11 to support a shaft 6 on the load side of the rotor 1 is arranged. At the center of a bottom surface of the recessed part 4c (seating surface part 4b), a hole 4d for insertion of the shaft 6 on the load side of the rotor 1 is formed.

A fastening member is inserted into the flange part 3a and the flange part 4a and the fastening member is fastened after the bracket 4 is provided in such a manner to cover an opening part of the frame 3, whereby the bracket 4 is fixed to the frame 3.

The stator 2 includes a ring-shaped stator iron core 13 and a winding wire 14 to which electric power from the outside is suppled. The stator 2 is fixed to an inner side of the frame 3, for example, by a method of shrinkage fitting or the like.

The stator iron core 13 is formed by laminating of a plurality of electromagnetic steel sheets, each of which is stamped into a predetermined shape, in the axial direction. On an inner peripheral side of the stator iron core 13, a plurality of teeth (not illustrated) is provided at equal intervals in a circumferential direction.

Around each tooth, the winding wire 14 is wound via an insulator (not illustrated). Then, the rotor 1 is arranged with a predetermined gap 15 on an inside diameter side of the stator 2.

The rotor 1 includes a ring-shaped rotor iron core 5, the shaft 6, a plurality of permanent magnets 7 (magnet), and an end sheet 8.

The rotor 1 is arranged with the gap 15 on the inside diameter side of the stator 2. At the center of the rotor 1, the shaft 6 is provided.

In the rotor iron core 5 included in the rotor 1, a plurality of magnet insertion holes 9 (see FIG. 2) corresponding to the number of magnetic poles is arranged.

Each magnet insertion hole 9 is a space surrounded by an inner side surface in a radial direction 5A3 of a first iron core 5A, an outer side surface in a radial direction 5B1*a* of a second iron core 5B, and a flux barrier 16 (all of which will be described later) and formed as a hole for insertion of a magnet. Each magnet insertion hole 9 is extended in the axial direction in such a manner as to pierce through both ends of the rotor iron core 5.

An inner iron core 5B1 includes a plurality of protrusions 5B1*b* (see FIG. 4) to regulate movement of each permanent magnet 7. Each protrusion 5B1*b* is formed in both end parts in the circumferential direction on the outer side surface in a radial direction 5B1*a* of the inner iron core 5B1. Since the end surface in a circumferential direction 7*c* of each permanent magnet 7 is held with each protrusion 5B1*b* when the protrusion 5B1*b* is provided in such a manner, it is possible to hold the permanent magnet 7 immovable during driving.

However, when the protrusions 5B1*b* are provided, the protrusions 5B1*b* become the shortest flux path of magnetic flux generated by the winding wire 14. When the permanent magnet 7 is crossed in an opposite direction of a direction of magnetization of the permanent magnet 7, irreversible demagnetization is easily caused. Thus, a height in the radial direction of each protrusion 5B1*b* is as low as possible in a range in which each permanent magnet 7 can be held.

In each magnet insertion hole 9, permanent magnets 7 with different polarities are arranged alternately in the circumferential direction. The number of poles of the permanent magnets 7 is six (see FIG. 3) in the rotor 1 illustrated as an example. However, the number of magnetic poles of the permanent magnets 7 is not limited to this. Also, a sectional surface of each permanent magnet 7 illustrated in FIG. 3 has a tabular rectangle shape. However, a shape of each permanent magnet 7 is not limited to this and a different shape may be included according to a purpose of reducing a noise or improving demagnetization resistance. In such a case, a shape of the inner side surface in a radial direction 5A3 of the first iron core 5A or a shape of the outer side surface in a radial direction 5B1*a* of the inner iron core 5B1 of the second iron core 5B is formed as a shape corresponding to a shape of each permanent magnet 7.

To both end surfaces of the rotor iron core 5, disk-shaped end sheets 8 are respectively attached (see FIG. 1). Each end sheet 8 is to prevent the permanent magnets 7 inserted into each magnet insertion hole 9 from falling off.

As a method of fixing each end sheet 8 to each end surface of the rotor iron core 5, for example, a method of providing a through hole in each of the rotor iron core 5 and the end sheet 8 and fasting a bolt to the through hole or swaging a rivet in the through hole may be used other than welding or adhesion.

As a different method, a method of providing a spigot structure on abutting surfaces of each end surface of the rotor iron core 5 and each end sheet 8 and attaching the end sheet 8 to the end surface of the rotor iron core 5 may be used. In the spigot structure, for example, a recessed part is formed on a surface of the rotor iron core 5 which surface faces each end sheet 8, a protruded part is provided on a surface of each end sheet 8 which surface faces the rotor iron core 5, and the protruded part and the recessed part are fitted to each other.

At a center part in the radial direction of the rotor iron core 5, a shaft fitting hole 18 is provided. To the shaft fitting hole 18, the shaft 6 to transmit rotation energy is fitted by shrinkage fitting or pressure fitting. The shaft 6 has a cylindrical shape and the shaft fitting hole 18 has a shape corresponding to this.

Both end parts of the shaft 6 fitted to the shaft fitting hole 18 are supported rotatably by the bearing 11 arranged in the bracket 4 and the bearing 10 arranged in the frame 3.

As illustrated in FIG. 2, the rotor iron core 5 includes a plurality of first iron cores 5A and a second iron core 5B.

Each first iron core 5A is formed by stamping and laminating of a plurality of electromagnetic steel sheets having silicon steel or Armco iron with a superior magnetic characteristic. Each first iron core 5A is arranged on an outer side in the radial direction of each permanent magnet 7 (see FIG. 3).

The second iron core 5B is formed by stamping and laminating of a plurality of high-strength steel sheets having carbon steel or the like with mechanical strength higher than that of the electromagnetic steel sheets of each first iron core 5A.

The second iron core 5B includes an inner iron core 5B1 and a plurality of inter-magnetic pole iron cores 5B2. The inner iron core 5B1 is arranged on an inner side in the radial direction of each permanent magnet 7 and each inter-magnetic pole iron core 5B2 is formed integrally with the inner iron core 5B1 and is arranged between magnetic poles 17 of each permanent magnet 7.

As illustrated in FIG. 4, the first iron cores 5A and the second iron core 5B are arranged in such a manner that an outer peripheral surface 5B2*a* of each inter-magnetic pole iron core 5B2 and an outer peripheral surface 5A1 of each first iron core 5A are on the same circumference when each permanent magnet 7 is arranged.

Each inter-magnetic pole iron core 5B2 includes a trunk part 5B21 extended from the inner iron core 5B1 to the outer side in the radial direction and two branch parts 5B22 that are an end part of the trunk part 5B21 which part branches into two and is in contact with an end part in a circumferential direction 5A2 of each first iron core 5A. In such a manner, each inter-magnetic pole iron core 5B2 is formed from the inner iron core 5B1 to the end part in a circumferential direction 5A2 of each first iron core 5A in such a manner as to regulate positions in the radial direction and the circumferential direction of each first iron core 5A. A shape of a sectional surface of each inter-magnetic pole iron core 5B2 is a T-shape.

An abutting surface in a circumferential direction 5B22*a* of a leading end part 5B22A of each branch part 5B22 is in contact with an abutting surface in a circumferential direction 5A22 of each first iron core 5A and an abutting surface in a radial direction 5B22*b* of the leading end part 5B22A of each branch part 5B22 is in contact with an abutting surface in a radial direction 5A21 of each first iron core 5A when each permanent magnet 7 is arranged. That is, the leading end part 5B22A of each branch part 5B22 is formed in such a manner as to regulate a position in the circumferential direction of each first iron core 5A and a position in the radial direction thereof.

With a configuration in such a manner, even in a case where centrifugal force acts on each first iron core 5A and each permanent magnet 7 due to a rotation of the rotor 1, it is possible to securely prevent each first iron core 5A and each permanent magnet 7 from coming off from the rotor iron core 5 due to the centrifugal force.

Between each permanent magnet 7 and each inter-magnetic pole iron core 5B2, the flux barrier 16 that is a gap for preventing short-circuiting of magnetic flux is formed. In the rotor iron core 5 in FIG. 3, 12 flux barriers 16 are formed.

As illustrated in FIG. 4, for example, each flux barrier 16 is formed from abutting surfaces of each first iron core 5A and each inter-magnetic pole iron core 5B2 to an end surface in a circumferential direction 7c of each permanent magnet 7. Note that the abutting surfaces of each first iron core 5A and each inter-magnetic pole iron core 5B2 mean abutting surfaces in the radial direction of each first iron core 5A and each inter-magnetic pole iron core 5B2 and abutting surfaces in the circumferential direction of each first iron core 5A and each inter-magnetic pole iron core 5B2. Also, the abutting surfaces in the radial direction mean an abutting surface in a radial direction 5A21 of each first iron core 5A and an abutting surface in a radial direction 5B22b of each inter-magnetic pole iron core 5B2. The abutting surfaces in the circumferential direction mean an abutting surface in a circumferential direction 5A22 of each first iron core 5A and an abutting surface in a circumferential direction 5B22a of each inter-magnetic pole iron core 5B2.

In such a manner, the rotor iron core 5 according to the present embodiment includes the plurality of first iron cores 5A including an electromagnetic steel sheet with a superior magnetic characteristic, the second iron core 5B including a high-strength steel sheet with high mechanical strength, and the flux barrier 16. Hereinafter, an effect of that will be described.

An outer side surface in a radial direction 7a and an inner side surface in a radial direction 7b of each permanent magnet 7 arranged in each magnet insertion hole 9 are connected to each other via the inter-magnetic pole iron core 5B2 formed between the magnetic poles 17 of the permanent magnets 7. For example, magnetic flux generated in each permanent magnet 7 passes through the stator iron core 13 (see FIG. 1) and goes back to the rotor iron core 5. However, a part of magnetic flux that goes out from each permanent magnet 7 passes through the inter-magnetic pole iron cores 5B2 and becomes leakage flux that does not contribute to a torque.

On the other hand, since centrifugal force during a high-speed rotation of the rotor 1 acts on the permanent magnets 7 and the first iron cores 5A, the rotor iron core 5 needs to have mechanical strength for resisting the centrifugal force. In a case where a high-strength steel sheet is used in the whole rotor iron core 5, an iron loss in the rotor is increased compared to a case where a general electromagnetic steel sheet that is not a high-strength steel sheet is used although it is possible to satisfy mechanical strength for resisting the centrifugal force in a high-speed rotation of the rotor 1.

In view of such a problem, the rotor iron core 5 according to the present embodiment includes the plurality of first iron cores 5A including an electromagnetic steel sheet with a superior magnetic characteristic, the second iron core 5B including a high-strength steel sheet with high mechanical strength, and the flux barrier 16.

According to the rotor iron core 5 configured in such a manner, it is possible to control an increase in an iron loss in the rotor since the first iron cores 5A in which the most of the iron loss in the whole rotor is generated include an electromagnetic steel sheet.

Also, since the inter-magnetic pole iron cores 5B2 to support the centrifugal force that acts on the first iron cores 5A and the permanent magnets 7 include a high-strength steel sheet, it is possible to improve centrifugal force resistant strength.

Also, the flux barrier 16 has a function of narrowing down a width of a flux path in which leakage flux passes. That is, the flux barrier 16 has a function of narrowing down a width in the circumferential direction of the trunk part 5B21 in which the leakage flux passes and of narrowing down a width in the radial direction of each of the branch parts 5B22 in which the leakage flux passes. In other words, the flux barrier 16 has a function of increasing effective magnetic flux. With this configuration, short-circuiting of magnetic flux in an end part in the circumferential direction of each permanent magnet 7 is prevented and it becomes easy for the magnetic flux to move to the stator 2 (see FIG. 1), whereby it is possible to increase generated torque.

Note that by adequately setting a length and a width of the flux barrier 16 extended in the circumferential direction along each of the branch parts 5B22, it is possible to bring the magnetic flux flowing on the surface of the rotor iron core 5 closer to a sinusoid, to reduce an iron loss in the rotor, and to reduce a noise.

Also, the branch parts 5B22 may be configured in the following manner. In FIG. 4, when the number of magnetic poles is P, angular velocity (maximum angular velocity) of a rotation of the rotor 1 is ω, a sheet thickness of each high-strength steel sheet included in the second iron core 5B is t, strength of each high-strength steel sheet is $\sigma_y$, mass of a pair of a first iron core 5A having a thickness corresponding to this sheet thickness t and a permanent magnet 7 in one pole is m, a distance from a position of a center of gravity G of this pair to a center of a shaft C is r, and a width in a radial direction of a branch part 5B22 at a position away for a certain distance x in the circumferential direction from an abutting surface in a circumferential direction 5B22a of a leading end part 5B22A of the branch part 5B22 toward an inter-magnetic pole iron core 5B2 is h, the width in the radial direction h of the branch part 5B22 is set in such a manner as to satisfy an expression (1).

[Math 1]

$$h > \omega \sqrt{\frac{3m \cdot r \cdot x}{t \cdot \sigma_y} \cos\left(\frac{\pi}{P}\right)} \qquad (1)$$

With the setting in such a manner, it is possible to satisfy mechanical strength for resisting centrifugal force in a high-speed rotation of the rotor 1. For example, in a case where a distribution of magnetic flux density on the surface of the rotor iron core 5 (deviation from sinusoid) is ignored and the width in the radial direction h of the branch part 5B22 is made as narrow as possible, the width in the radial direction h of the branch part 5B22 is determined by an expression (2) with a safety factor as α (α is value larger than 1).

[Math 2]

$$h = \alpha \cdot \omega \sqrt{\frac{3m \cdot r \cdot x}{t \cdot \sigma_y} \cos\left(\frac{\pi}{P}\right)} \qquad (2)$$

Note that the value of the safety factor α is set in consideration of a material characteristic, a variation in production, or the like. Also, as the strength $\sigma\sigma_y$ of each high-strength steel sheet, yield stress is generally used. In a case where fatigue becomes a problem (case where the number of rotations changes frequently), a fatigue limit is used.

Here, a reason why the width in the radial direction h of the branch part 5B22 is set in such a manner as to satisfy the expression (1) at the certain distance x will be described.

An amount of centrifugal force F that acts on the pair of the first iron core 5A having a thickness corresponding to the above-described sheet thickness t and the permanent magnet 7 in one pole becomes the largest when the rotor 1 rotates at the maximum angular velocity co and is expressed by an expression (3).

[Math 3]

$$F = m \cdot r \cdot \omega^2 \tag{3}$$

Since the centrifugal force F in the expression (3) is supported by two branch parts 5B22 on both of right and left sides of the first iron core 5A, force f that works in the radial direction of a leading end part 5B22A of each branch part 5B22 is expressed by an expression (4) in a case where an angle formed by a line that connects the center of a shaft C and the position of the center of gravity G and a line that connects the center of a shaft C and the leading end part 5B22A of the branch part 5B22 (abutting surface in circumferential direction 5B22a) is θ (unit is rad).

[Math 4]

$$f = \frac{F}{2} \cos\theta \tag{4}$$

Generally, since a length in the circumferential direction of the branch part 5B22 is set adequately short compared to a length in the circumferential direction of one magnetic pole, the angle θ can be assumed as an expression (5).

[Math 5]

$$\theta = \frac{\pi}{P} \text{(Unit is rad)} \tag{5}$$

Thus, the expression (4) is expressed as an expression (6).

[Math 6]

$$f = \frac{F}{2} \cos\left(\frac{\pi}{P}\right) \tag{6}$$

From the expression (3) and the expression (6), the force f is expressed by an expression (7).

[Math 7]

$$f = \frac{m \cdot r \cdot \omega^2}{2} \cos\left(\frac{\pi}{P}\right) \tag{7}$$

As described above, since the length in the circumferential direction of the branch part 5B22 is generally adequately short compared to the length in the circumferential direction of one magnetic pole, the branch part 5B22 having a thickness corresponding to the sheet thickness t can be assumed as a cantilever in which a concentrated load (force f) is applied to the leading end part 5B22A. A bending moment M at the above-described position in the certain distance x is expressed by an expression (8).

[Math 8]

$$M = f x \tag{8}$$

From the expression (7) and the expression (8), the bending moment M is expressed by an expression (9).

[Math 9]

$$M = \frac{m \cdot r \cdot \omega^2 \cdot x}{2} \cos\left(\frac{\pi}{P}\right) \tag{9}$$

A section modulus Z at the position in the certain distance x is expressed by an expression (10).

[Math 10]

$$z = \frac{t \cdot h^2}{6} \tag{10}$$

A maximum value $\sigma_{max}$ of stress at the position in the certain distance x is expressed by an expression (11).

[Math 11]

$$\sigma_{max} = \frac{M}{Z} \tag{11}$$

From the expression (9), the expression (10), and the expression (11), the maximum value $\sigma_{max}$ of the stress is expressed by an expression (12).

[Math 12]

$$\sigma_{max} = \frac{3 m \cdot r \cdot \omega^2 \cdot x}{t \cdot h^2} \cos\left(\frac{\pi}{P}\right) \tag{12}$$

The maximum value σmax of the stress needs to be lower than the strength $\sigma_y$ of each high-strength steel sheet at an arbitrary position of the branch part 5B22. Thus, the value of the certain distance x needs to satisfy an expression (13).

[Math 13]

$$\frac{3 m \cdot r \cdot \omega^2 \cdot x}{t \cdot h^2} \cos\left(\frac{\pi}{P}\right) < \sigma_y \tag{13}$$

When being written with respect to the width in the radial direction h, the expression (13) is expressed by an expression (14) and the expression (1) is acquired from the expression (14).

[Math 14]

$$h^2 > \frac{3 m \cdot r \cdot \omega^2 \cdot x}{t \cdot \sigma_y} \cos\left(\frac{\pi}{P}\right) \tag{14}$$

Note that each flux barrier 16 of the present embodiment is formed from the abutting surfaces of each first iron core 5A and each inter-magnetic pole iron core 5B2 to the end surface in a circumferential direction 7c of each permanent magnet 7. However, for example, a flux barrier 16 may be formed only in a region 16a (see FIG. 4) between the end surface in a circumferential direction 7c of each permanent magnet 7 and the trunk part 5B21. Also, a flux barrier 16 may be formed only in a region 16b between a leading end part in a circumferential direction 5A23 of each first iron core 5A and each branch part 5B22.

In such a manner, even in a case where a flux barrier 16 is formed in a region that is a part of a region from the abutting surfaces of each first iron core 5A and each inter-magnetic pole iron core 5B2 to the end surface in a circumferential direction 7c of each permanent magnet 7, it is possible to control an increase in an iron loss and leakage flux compared to the above-described conventional technology while securing mechanical strength for resisting centrifugal force.

As described above, the rotor iron core 5 of the permanent-magnet-embedded motor 100 according to the present embodiment includes: the plurality of first iron cores 5A formed by laminating of a plurality of electromagnetic steel sheets and arranged in an outer side in the radial direction of each permanent magnet 7; and the second iron core 5B formed by laminating of a plurality of electromagnetic steel sheets (high-strength steel sheet) with mechanical strength higher than mechanical strength of the plurality of electromagnetic steel sheets of the first iron cores 5A and that includes the inner iron core 5B1 arranged on an inner side in the radial direction of each permanent magnet 7 and the plurality of inter-magnetic pole iron cores 5B2 formed integrally with the inner iron core 5B1 and arranged between the magnetic poles 17 of each permanent magnet 7, wherein each inter-magnetic pole iron core 5B2 is formed from the end part in a circumferential direction 5A2 of each first iron core 5A to the inner iron core 5B1 in such a manner as to regulate a position of each first iron core 5A, and the flux barrier 16 is formed between each permanent magnet 7 and each inter-magnetic pole iron core 5B2.

In such a manner, since the first iron cores 5A in which the most of an iron loss in the whole rotor is generated includes the electromagnetic steel sheets, it is possible to control an increase in the iron loss in the rotor. Also, since the inter-magnetic pole iron cores 5B2 to support the centrifugal force that acts on the first iron cores 5A and the permanent magnets 7 include the high-strength steel sheets, it is possible to improve centrifugal force resistant strength. That is, it is possible to improve the centrifugal force resistant strength and to control an increase in an iron loss at the same time. Also, since it is possible to increase effective magnetic flux by the flux barriers 16, it is possible to increase generated torque.

Also, each flux barrier 16 is formed from abutting surfaces of each first iron core 5A and each inter-magnetic pole iron core 5B2 to the end surface in a circumferential direction 7c of each permanent magnet 7. With this configuration, it is possible to control an increase in leakage flux compared to a case where a flux barrier 16 is formed only in a region that is a part of a region from the abutting surfaces of each first iron core 5A and each inter-magnetic pole iron core 5B2 to the end surface in a circumferential direction 7c of each permanent magnet 7.

The inner iron core 5B1 includes a plurality of protrusions 5B1b formed in both end parts in the circumferential direction of the outer side surface in a radial direction 5B1a in contact with each permanent magnet 7 and that regulates a position of each permanent magnet 7. Each flux barrier 16 is formed from the abutting surfaces of each first iron core 5A and each inter-magnetic pole iron core 5B2 to each protrusion 5B1b. With this configuration, since the end surface in a circumferential direction 7c of each permanent magnet 7 is held by each protrusion 5B1b, it is possible to hold the permanent magnet 7 immovable during driving and to control an increase in leakage flux.

Second Embodiment

Figure 5:
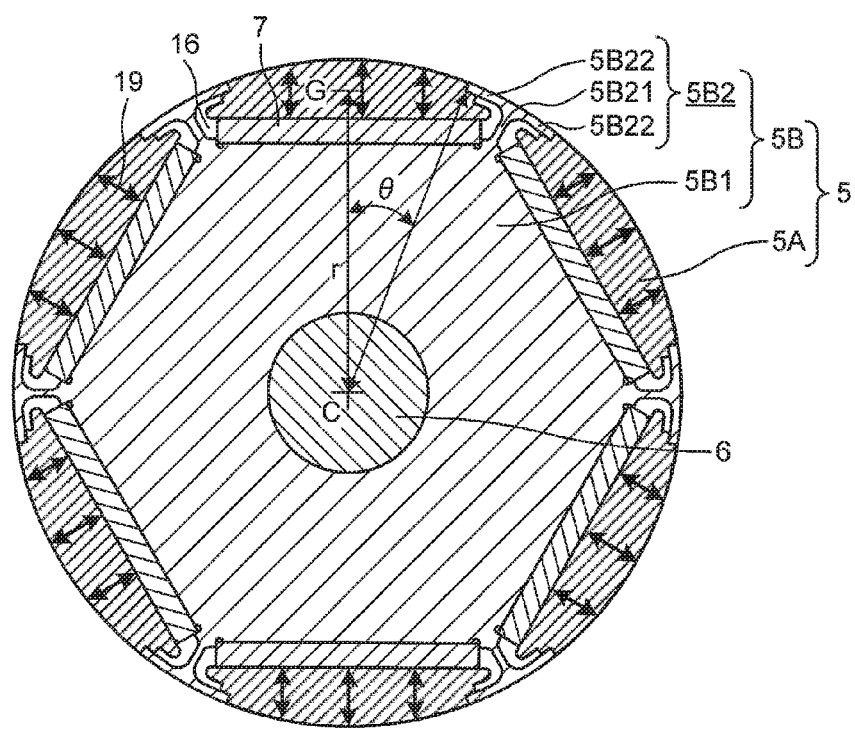
FIG. 5 is a sectional view of a rotor iron core of a permanent-magnet-embedded motor according to a second embodiment of the present invention.

FIG. 5 is a sectional view of a rotor iron core 5 of a permanent-magnet-embedded motor 100 according to a second embodiment of the present invention. As illustrated in FIG. 5, in the rotor iron core 5 of the second embodiment, a direction of easy magnetization 19 (direction in which direction of crystal axis of material included in electromagnetic steel sheet is the most likely to be magnetized) of each electromagnetic steel sheet included in a first iron core 5A is set in a radial direction in addition to the configuration of the first embodiment.

Although being changed slightly due to relative positions (phase) in a circumferential direction of the first iron core 5A and a tooth of a stator iron core 13 and a conductive state of a winding wire 14, a direction of magnetic flux passing through the first iron core 5A faces a substantially radial direction in the whole phase. Thus, when the direction of easy magnetization 19 of each electromagnetic steel sheet included in the first iron core 5A is set to the radial direction and a magnetic characteristic is improved, it is possible to improve efficiency of a magnetic circuit and to decrease an iron loss. Thus, it is possible to improve efficiency and an output of the permanent-magnet-embedded motor 100.

Note that a direction of magnetic flux on an inner side in the radial direction of the permanent magnet 7 is not changed according to a phase. However, the magnetic flux on the inner side in the radial direction of the permanent magnet 7 faces various directions. Thus, it is preferred that a magnetic characteristic of a high-strength steel sheet included in a second iron core 5B does not have directionality.

Third Embodiment

Figure 6:
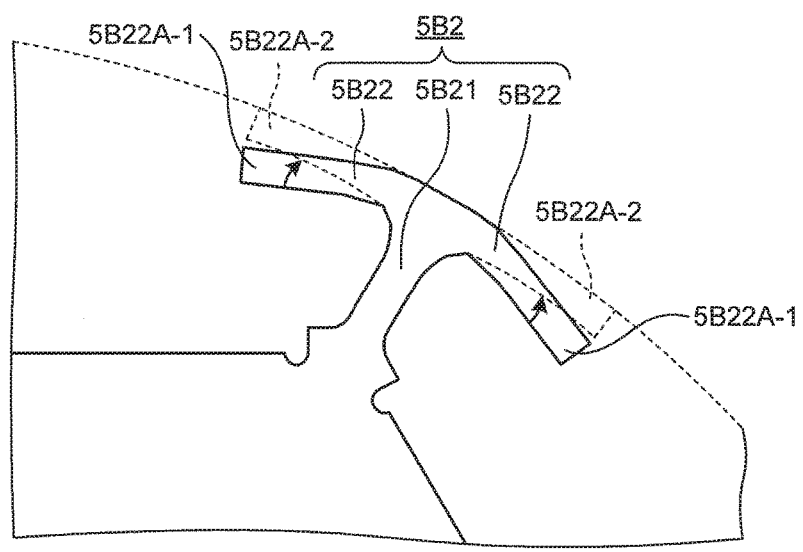
FIG. 6 is a sectional of a rotor iron core of a permanent-magnet-embedded motor according to a third embodiment of the present invention.

FIG. 6 is a sectional view of a rotor iron core 5 of a permanent-magnet-embedded motor 100 according to a third embodiment of the present invention. In the rotor iron core 5 of the third embodiment, a leading end part 5B22A of each branch part 5B22 is formed in such a manner that a position thereof before an arrangement of each permanent magnet 7 is on an inner side in a radial direction of a position thereof after the arrangement of each permanent magnet 7 so as to bias an abutting surface in a radial direction 5B22b of a first iron core 5A with biasing force toward the inner side in the radial direction when each permanent magnet 7 is arranged.

In FIG. 6, a leading end part 5B22A-1 indicated by a solid line indicates a state before an arrangement of each permanent magnet 7 and a leading end part 5B22A-2 indicated by a dotted line indicates a state after the arrangement of each permanent magnet 7.

In such a manner, an inter-magnetic pole iron core 5B2 of the third embodiment is formed in such a manner that a position of the leading end part 5B22A of each branch part 5B22 thereof before an arrangement of each permanent magnet 7 is on the inner side in the radial direction of a position thereof after the arrangement of each permanent magnet 7.

Accordingly, when each permanent magnet 7 is inserted into each magnet insertion hole 9 illustrated in FIG. 2, the leading end part 5B22A is deformed from the position indicated by the solid line to the position indicated by the dotted line. Here, to each branch part 5B22, force of moving the position of the leading end part 5B22A thereof toward the position indicated by the solid line is applied. This force biases the first iron core 5A placed on the inner side in the radial direction of the leading end part 5B22A in a direction of an axial center. Thus, the first iron core 5A can be in contact with the permanent magnet 7 with predetermined pressing force. That is, after assembly of the first iron core 5A, a second iron core 5B, and the permanent magnet 7, the permanent magnet 7 is elastically sandwiched between the first iron core 5A and the second iron core 5B and is tightly fixed between the first iron core 5A and the second iron core 5B. Thus, it is possible to reduce a noise or vibration during driving and to prevent the permanent magnet 7 from being broken or cracked.

Note that the configuration described in each of the above embodiments is an example of a configuration of the present invention. It is obvious that it is possible to make a combination with a different known technology or to modify a configuration within the spirit and the scope of the preset invention, for example, by omitting a part.

INDUSTRIAL APPLICABILITY

As described above, the present invention can be applied to a permanent-magnet-embedded motor and is specifically useful as an invention that can control an increase in an iron loss and leakage flux while securing mechanical strength for resisting centrifugal force.

The invention claimed is:

1. A permanent-magnet-embedded motor in which a plurality of magnets is embedded in a rotor iron core,
   wherein the rotor iron core includes:
   a plurality of first iron cores arranged on an outer side in a radial direction of each magnet; and
   a second iron core having mechanical strength higher than mechanical strength of each of the first iron cores and that includes an inner iron core arranged on an inner side in the radial direction of each of the magnets and a plurality of inter-magnetic pole iron cores formed integrally with the inner iron core and arranged between magnetic poles of each of the magnets,
   each of the inter-magnetic pole iron cores contacts an end part in a circumferential direction of each of the first iron cores and is formed from the end part in the circumferential direction of each of the first iron cores to the inner iron core, and
   a flux barrier is formed between each of the magnets and each of the inter-magnetic pole iron cores.

2. The permanent-magnet-embedded motor according to claim 1, wherein the flux barrier is formed from abutting surfaces of each of the first iron cores and each of the inter-magnetic pole iron cores to an end surface in the circumferential direction of each of the magnets.

3. The permanent-magnet-embedded motor according to claim 1, wherein the inner iron core includes a plurality of protrusions formed in both end parts in the circumferential direction of an outer side surface in the radial direction, which surface is in contact with each of the magnets, and that regulates a position of each of the magnets, and
   the flux barrier is formed from abutting surfaces of each of the first iron cores and each of the inter-magnetic pole iron cores to each of the protrusions.

4. The permanent-magnet-embedded motor according to claim 1, wherein a direction of easy magnetization of each of the first iron cores is set in a radial direction.

5. The permanent-magnet-embedded motor according to claim 1, wherein each of the inter-magnetic pole iron cores includes a trunk part extended from the inner iron core to an outer side in the radial direction, and two branch parts that are an end part of the trunk part which end part branches into two and is in contact with the end part in the circumferential direction of each of the first iron cores, and
   a leading end part of each of the branch parts is formed in such a manner that a position thereof before an arrangement of each of the magnets is on an inner side in the radial direction of a position thereof after the arrangement of each of the magnets so as to bias an abutting surface in the radial direction of each of the first iron cores with biasing force toward the inner side in the radial direction when each of the magnets is arranged.

6. The permanent-magnet-embedded motor according to claim 5, wherein when the number of magnetic poles of the magnets is P, angular velocity of a rotation of the rotor is $\omega$, a sheet thickness of each of the high-strength steel sheets included in the second iron core is t, strength of each of the high-strength steel sheets is $\sigma_y$, mass of a pair of the first iron cores having a thickness corresponding to the sheet thickness t and the magnets in one pole is m, a distance from a position of a center of gravity G of this pair to a center of a shaft C is r, and a width in the radial direction of each of the branch parts at a position away for a certain distance x in the circumferential direction from an abutting surface in the circumferential direction of the leading end part of each of the branch parts toward each of the inter-magnetic pole iron cores is h, the width in the radial direction h of each of the branch parts is set in such a manner as to satisfy the following expression,

[Math 1]

$$h > \omega \sqrt{\frac{3m \cdot r \cdot x}{t \cdot \sigma_y} \cos\left(\frac{\pi}{P}\right)}. \qquad (1)$$

\* \* \* \* \*